United States Patent
Wang et al.

(10) Patent No.: US 12,088,731 B2
(45) Date of Patent: Sep. 10, 2024

(54) PROGRAM SIGNING METHOD

(71) Applicant: Jabil Circuit (Singapore) Pte. Ltd., Singapore (SG)

(72) Inventors: Cheng Huang Wang, Kaohsiung (TW); Chin Liang, New Taipei (TW); Shuo-Hung Hsu, New Taipei (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 280 days.

(21) Appl. No.: 17/686,545

(22) Filed: Mar. 4, 2022

(65) Prior Publication Data

US 2022/0294641 A1    Sep. 15, 2022

(30) Foreign Application Priority Data

Mar. 10, 2021 (TW) ................................ 110108576

(51) Int. Cl.
*H04L 9/32* (2006.01)
*G06F 21/55* (2013.01)

(52) U.S. Cl.
CPC ............ *H04L 9/3247* (2013.01); *G06F 21/55* (2013.01); *H04L 9/3236* (2013.01); *G06F 2221/033* (2013.01)

(58) Field of Classification Search
CPC .... G06F 21/64; G06F 21/55; G06F 2221/033; H04L 9/3236; H04L 9/3247; H04L 9/3249
See application file for complete search history.

(56) References Cited

U.S. PATENT DOCUMENTS

| | | | |
|---|---|---|---|
| 10,871,955 B2 | 12/2020 | Lewis | |
| 10,983,783 B2 | 4/2021 | Zhang et al. | |
| 2004/0083366 A1* | 4/2004 | Nachenberg | G06F 21/51 713/170 |
| 2004/0153644 A1* | 8/2004 | McCorkendale | G06F 21/56 726/24 |
| 2005/0138392 A1* | 6/2005 | Johnson | G06F 21/6218 713/186 |
| 2008/0247549 A1* | 10/2008 | Blanc | B25J 9/1674 380/277 |

(Continued)

FOREIGN PATENT DOCUMENTS

| | | |
|---|---|---|
| CN | 107077557 A | 8/2017 |
| CN | 107924443 A | 4/2018 |
| CN | 110393019 B | 9/2020 |

OTHER PUBLICATIONS

Search Report appended to an Office Action, which was issued to Taiwanese counterpart application No. 110108576 by the TIPO on Jan. 6, 2022, with an English translation thereof.

*Primary Examiner* — Mohammad A Siddiqi
(74) *Attorney, Agent, or Firm* — Young Basile Hanlon & MacFarlane, P.C.

(57) ABSTRACT

A program signing method is provided to include: determining whether the signing program is tampered with; if not, obtaining a releasing hash that is related to a to-be-released program, and transmitting the releasing hash to a signature server unit, so as to make the signature server unit acquire a releasing digital signature based on the releasing hash and transmit the releasing digital signature to the processing module; and, upon receipt of the releasing digital signature, executing the signing program to generate a signed to-be-released program.

7 Claims, 6 Drawing Sheets

(56) References Cited

U.S. PATENT DOCUMENTS

| | | | |
|---|---|---|---|
| 2010/0275026 A1* | 10/2010 | McLean | G06F 21/12 |
| | | | 713/176 |
| 2013/0039491 A1* | 2/2013 | Unagami | G06F 21/575 |
| | | | 380/44 |
| 2014/0129828 A1* | 5/2014 | Rhee | H04L 9/3263 |
| | | | 713/156 |
| 2014/0205092 A1* | 7/2014 | Hartley | H04L 9/0877 |
| | | | 380/44 |
| 2018/0337772 A1* | 11/2018 | Acar | H04L 63/123 |
| 2018/0365423 A1 | 12/2018 | Poppe | |
| 2019/0305959 A1* | 10/2019 | Reddy | G06F 8/73 |
| 2020/0327230 A1* | 10/2020 | Bitauld | G06F 21/57 |
| 2021/0119781 A1* | 4/2021 | Liu | H04L 9/088 |
| 2021/0314166 A1* | 10/2021 | Maheshwari | H04L 9/3247 |
| 2022/0076253 A1* | 3/2022 | Chaum | G06Q 20/322 |
| 2022/0129550 A1* | 4/2022 | Olivier | G06F 21/566 |

\* cited by examiner

PROGRAM SIGNING METHOD

CROSS-REFERENCE TO RELATED APPLICATION

This application claims priority of Taiwanese Invention Patent Application No. 110108576, filed on Mar. 10, 2021.

FIELD

The disclosure relates to a program signing method, and more particularly to a program signing method to avoid a to-be-released program from being tampered with.

BACKGROUND

A program usually has multiple version updates during its developmental phase or after its release in order to have problems fixed, and the updates are usually provided by a vendor of the program. If a hacker or an employee provides a malicious program to embed some malicious or unwanted codes, or if an update problem is caused by human error, the vendor's reputation may be severely damaged.

To secure the program, the program is usually encrypted and an update tool will be used to decrypt the program and check the reliability of the program (whether it has been tampered with). Conventionally, when the program is to be encrypted, the program will be transmitted to personnel who specializes in executing a signature process, and the program is signed by the personnel manually operating a hardware security module to perform the signature process. However, the manual operation may have risks of operation error or the risk that the program may have been replaced or tampered with before the signature process.

SUMMARY

Therefore, an object of the disclosure is to provide a program signing method that can automatically sign a to-be-released program, so as to avoid malicious tampering or errors from manual operation.

According to the disclosure, the program signing method includes steps of: providing a computing device, wherein the computing device includes a processing module and a storage module, and the storage module is electrically connected to the processing module and stores a signing program for signing a to-be-released program, and a signing public key for authenticating the signing program, the signing program including a signing digital signature and a signing code; by the processing module, determining whether the signing program is tampered with based on the signing public key, the signing code and the signing digital signature; upon determining that the signing program is not tampered with, by the processing module that executes the signing program, obtaining a releasing hash that is related to the to-be-released program, and transmitting the releasing hash to a signature server unit, so as to make the signature server unit acquire a releasing digital signature based on the releasing hash and transmit the releasing digital signature to the processing module; and, upon receipt of the releasing digital signature, by the processing module that executes the signing program, generating a signed to-be-released program based on the releasing digital signature and the to-be-released program.

BRIEF DESCRIPTION OF THE DRAWINGS

Other features and advantages of the disclosure will become apparent in the following detailed description of the embodiment(s) with reference to the accompanying drawings, of which:

FIG. 5 is a flow chart illustrating an exemplary process to determine whether a compiling program is tampered with; and FIG. 6 is a flow chart illustrating an exemplary process to determine whether a compiling log file is tampered with.

DETAILED DESCRIPTION

Figure 1:
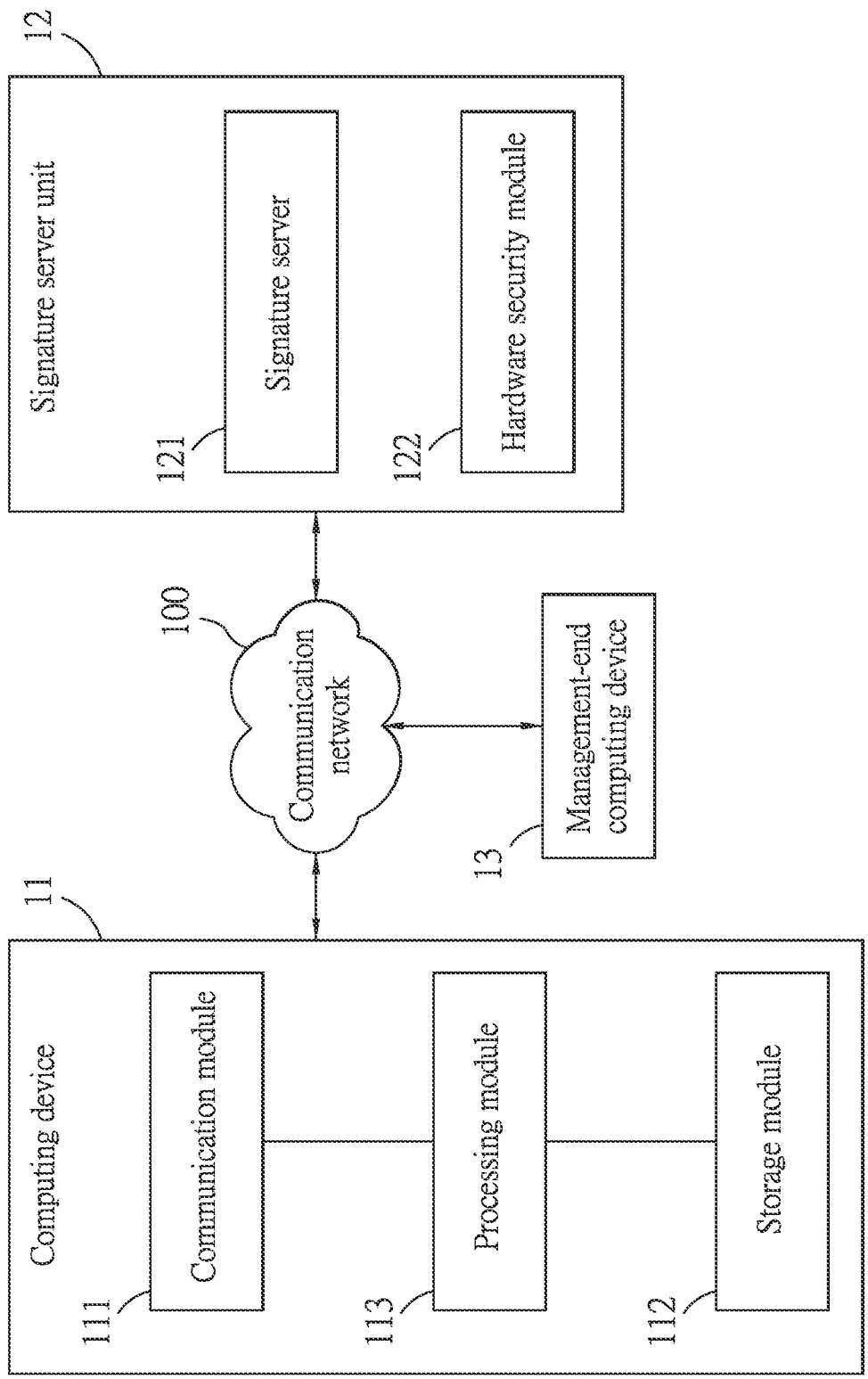
FIG. 1 is a block diagram illustrating a computing device, a signature server unit and a management-end computing device that cooperatively implement an embodiment of a program signing method according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a program signing method according to this disclosure is adapted for signing a to-be-released program (or adding a digital signature to a to-be-released program), and is implemented by a computing device 11. The computing device 11 includes a communication module 111 for connection to a communication network 100 (e.g., a local area network (LAN), the Internet, etc.), a storage module 112, and a processing module 113 that is electrically connected to the communication module 111 and the storage module 112. In some embodiments, the communication module 111 may be a network adapter or the like, the storage module 112 may be a flash drive, a hard disk drive, a solid state drive, or other data storage or memory devices, and the processing module 113 may be a single core processor, a multi-core processor, or the like, but this disclosure is not limited in this respect.

The storage module 112 stores a compiling program for compiling the to-be-released program, a compiling public key for authenticating the compiling program, a compiling log public key for authenticating a compiling log file, a compiling log private key corresponding to the compiling log public key, a signing program for signing the to-be-released program, a signing public key for authenticating the signing program, a signing log public key for authenticating a signing log file, a signing log private key corresponding to the signing log public key, a releasing program for releasing the to-be-released program, a releasing public key for authenticating the releasing program, a releasing log public key for authenticating a releasing log file, and a releasing log private key corresponding to the releasing log public key. The compiling program includes a compiling digital signature and a compiling code. The signing program includes a signing digital signature and a signing code. The releasing program includes a releasing digital signature and a releasing code. The computing device 11 is communicatively connected to a signature server unit 12 and a management-end computing device 13 through the communication network 100. The signature server unit 12 includes a signature server 121 and a hardware security module (HSM) 122.

In this embodiment, each of the computing device 11 and the management-end computing device 13 may be realized as a personal computer, a notebook computer, a server, a tablet computer, a smartphone, etc., but this disclosure is not limited in this respect.

In this embodiment, the program signing method includes a compiling procedure, a signing procedure and a releasing procedure.

Figure 2:
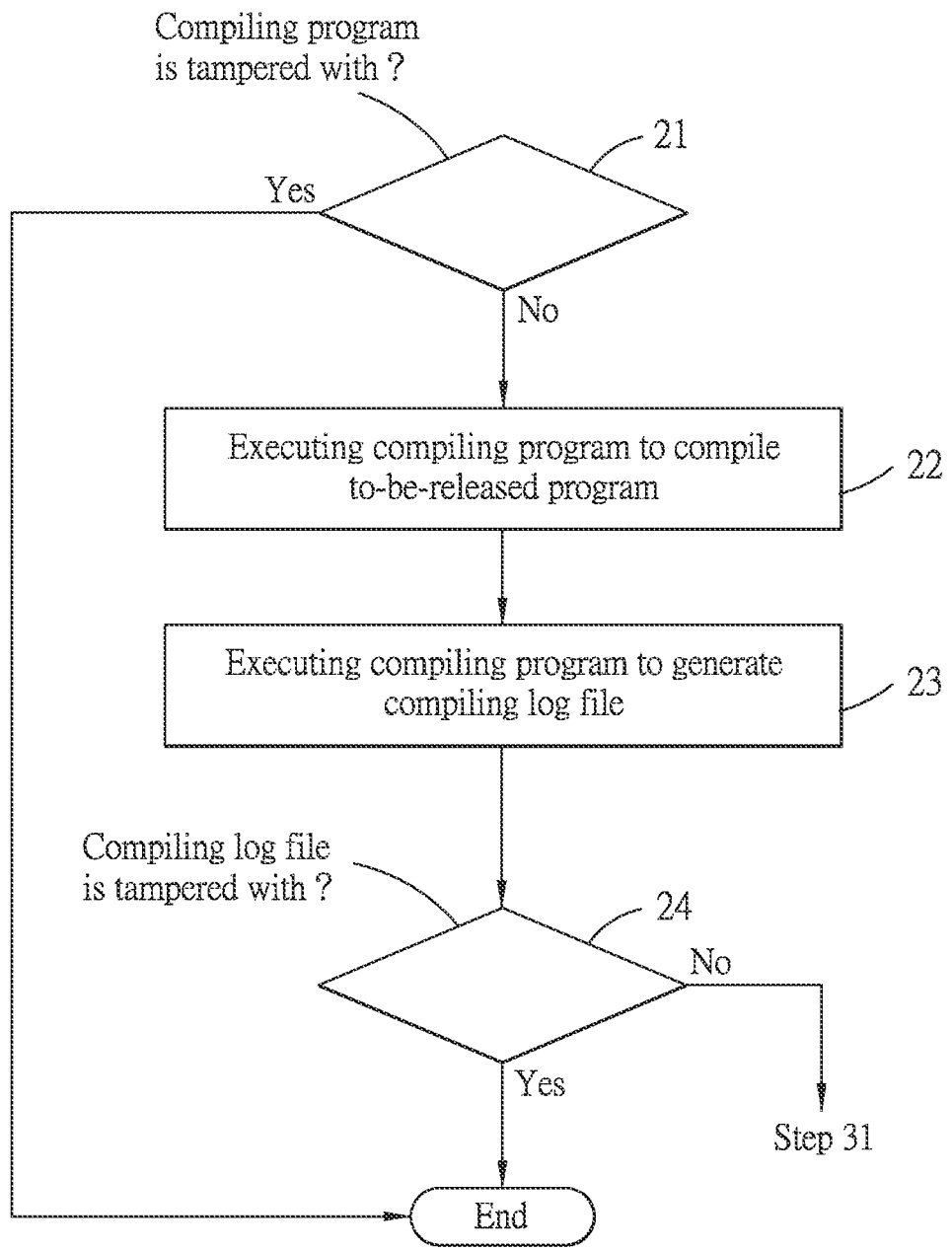
FIG. 2 is a flow chart illustrating a compiling procedure of the embodiment.

Referring to FIGS. 1 and 2, the compiling procedure is exemplified to include steps 21 to 24 for compiling the to-be-released program.

In step 21, the processing module 113 determines whether the compiling program is tampered with based on the compiling public key, the compiling code and the compiling digital signature. The flow goes to step 22 when the processing module 113 determines that the compiling program is not tampered with, and ends when otherwise.

Figure 5:
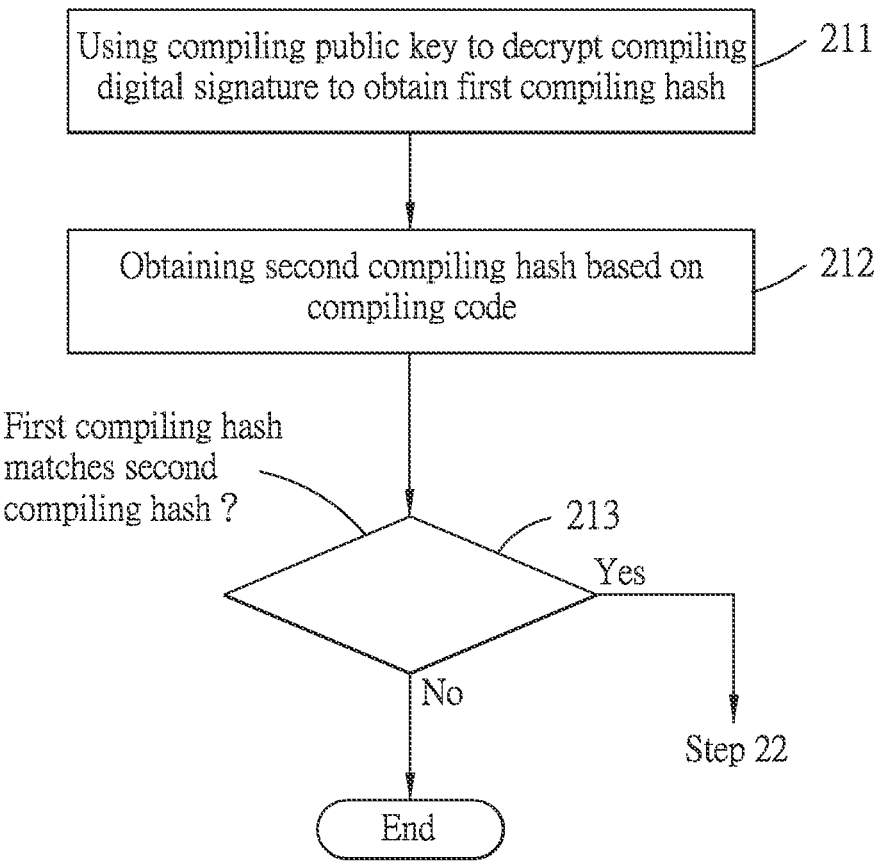

In this embodiment, step 21 includes sub-steps 211 to 213, as illustrated in FIG. 5.

In sub-step 211, the processing module 113 uses the compiling public key to decrypt the compiling digital signature, so as to obtain a first compiling hash (also called hash value, hash sum, hash code, digest, etc.).

In sub-step 212, the processing module 113 obtains a second compiling hash that is related to the compiling code by performing hash computation on the compiling code.

In sub-step 213, the processing module 113 determines whether the first compiling hash matches (e.g., being identical to) the second compiling hash, so as to determine whether the compiling program is tampered with. The flow goes to step 22 when the processing module 113 determines that the first compiling hash matches the second compiling hash, which means that the compiling program is not tampered with. Otherwise, the flow ends.

Referring to FIGS. 1 and 2 again, in step 22, the processing module 13 executes the compiling program to compile the to-be-released program, so as to obtain a compiled to-be-released program. In this embodiment, the to-be-released program may be software or firmware. When the to-be-released program is software, the compiled to-be-released program may be a binary file; and when the to-be-released program is firmware, the compiled to-be-released program may be an image file.

In step 23, the processing module 13 executes the compiling program to generate a compiling log file that is related to compiling of the to-be-released program. The compiling log file includes a compiling log digital signature and compiling log data. The compiling log data includes, for example but not limited to, a file name of the compiled to-be-released program, time of starting related to the compiling, time of completion related to the compiling, a status (progress) of the compiling procedure, a file path to locate the compiled to-be-released program, etc. The compiling log file records a history in terms of compiling the to-be-released program, so relevant personnel may check whether any abnormality occurs during the compiling procedure. The compiling log digital signature is obtained by performing hash computation on the compiling log data to obtain a compiling log hash that corresponds to the compiling log data, followed by using the compiling log private key to encrypt the compiling log hash.

In step 24, the processing module 113 determines whether the compiling log file is tampered with based on the compiling log public key, the compiling log data and the compiling log digital signature. The flow goes to step 31 to start the signing procedure when the processing module 113 determines that the compiling log file is not tampered with, and ends when otherwise.

Figure 6:
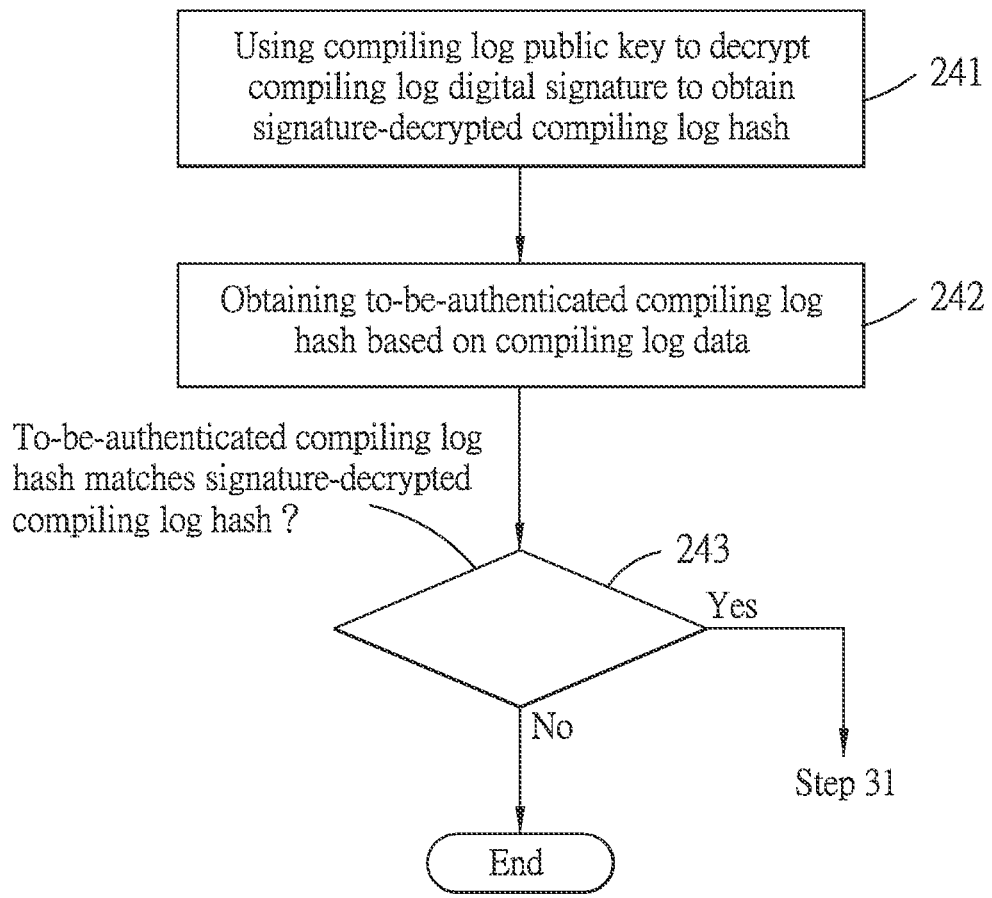

In this embodiment, step 24 includes sub-step 241 to 243, as illustrated in FIG. 6.

In sub-step 241, the processing module 113 uses the compiling log public key to decrypt the compiling log digital signature to obtain a signature-decrypted compiling log hash (which should be the same as the compiling log hash obtained in step 23).

In sub-step 242, the processing module 113 performs hash computation on the compiling log data to obtain a to-be-authenticated compiling log hash (which should be the same as the compiling log hash obtained in step 23 if the compiling log data is not tampered with).

In sub-step 243, the processing module 113 determines whether the to-be-authenticated compiling log hash matches the signature-decrypted compiling log hash. The flow goes to step 31 when the processing module 113 determines that the to-be-authenticated compiling log hash matches the signature-decrypted compiling log hash, which means that the compiling log file is not tampered with. Otherwise, the flow ends.

Figure 3:
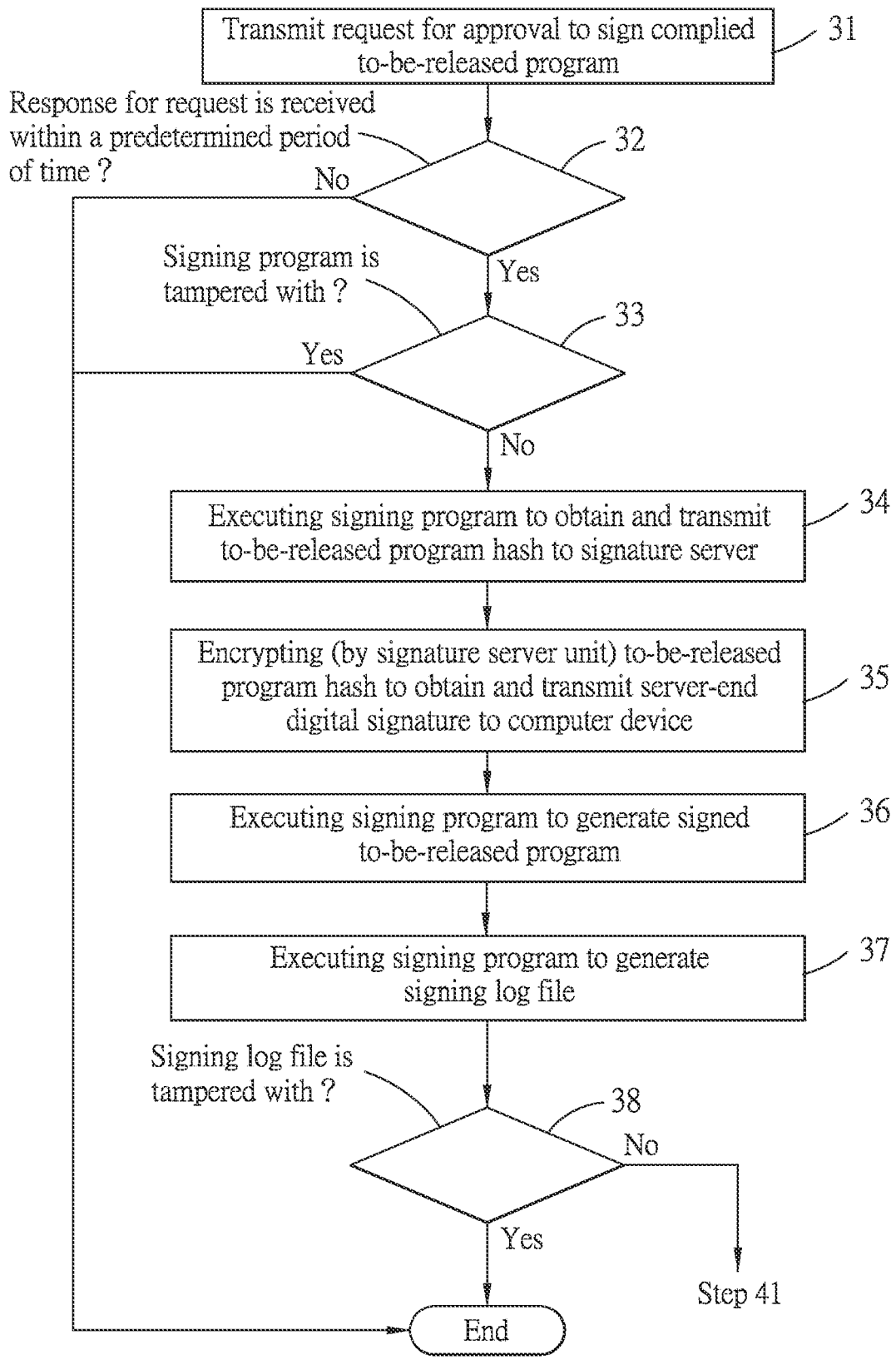
FIG. 3 is a flow chart illustrating a signing procedure of the embodiment.

Referring to FIGS. 1 and 3, the signing procedure is exemplified to include steps 31 to 38 for signing the compiled to-be-released program.

In step 31, the processing module 113 transmits, through the communication module 111 and the communication network 100, a request for approval to sign the compiled to-be-released program to the management-end computing device 13. If a person who is in charge of reviewing and approving the request agrees with the request, he or she may operate the management-end computing device 13 to approve the request, so that the management-end computing device 13 transmits a response that approves the request to the computing device 11.

In step 32, the processing module 113 determines, within a predetermined period of time, whether the response that approves the request is received from the management-end computing device 13 through the communication module 111 and the communication network 100. The flow goes to step 33 when the processing module 113 determines that the response that approves the request is received within the predetermined period of time, and ends when otherwise.

In step 33, the processing module determines whether the signing program is tampered with based on the signing public key, the signing code and the signing digital signature. The flow goes to step 34 when the processing module 113 determines that the signing program is not tampered with, and ends when otherwise. In this embodiment, the procedure for determining whether the signing program is tampered with is similar to the procedure for determining whether the compiling program is tampered with (i.e., steps 211 to 213). That is, the processing module 113 uses the signing public key to decrypt the signing signature, so as to obtain a first signing hash; then, the processing module 113 obtains a second signing hash that is related to the signing code by performing hash computation on the signing code; and the processing module 113 determines whether the first signing hash matches the second signing hash, so as to determine whether the signing program is tampered with. The flow goes to step 34 when the processing module 113 determines that the first signing hash matches the second signing hash, which means that the signing program is not tampered with. Otherwise, the flow ends. However, this disclosure is not limited in this respect.

In step 34, the processing module 113 executes the signing program to perform hash computation on the compiled to-be-released program, so as to obtain a to-be-released program hash that is related to the compiled to-be-released program, and transmits the to-be-released program hash to the signature server 121 of the signature server unit 12 through the communication module 111 and the communication network 100.

In step 35, upon receipt of the to-be-released program hash, the signature server 121 provides the to-be-released program hash to the hardware security module 122 for encrypting the to-be-released program hash to obtain a server-end digital signature, and transmits the server-end digital signature to the processing module 113 through the communication network 100.

In step 36, upon receipt of the server-end digital signature through the communication module 111 and the communication network 100, the processing module 113 executes the signing program to generate a signed to-be-released program based on the server-end digital signature and the compiled to-be-released program. In this embodiment, the processing module 113 combines the server-end digital signature and the compiled to-be-released program to generate the signed to-be-released program that, for example but not limited to, simply includes both of the server-end digital signature and the compiled to-be-released program.

In step 37, the processing module 113 executes the signing program to generate a signing log file that is related to generation of the signed to-be-released program. The signing log file includes a signing log digital signature and signing log data. In some embodiments, the signing log file may further include the compiling log file, but this disclosure is not limited in this respect. The signing log data includes, for example but not limited to, a globally unique identifier (GUID), a file name of the signing log file, time of starting related to the signing, time of completion related to the signing, a status (progress) of the signing procedure, a file path to locate the signed to-be-released program, etc. The signing log file records a history in terms of signing the compiled to-be-released program, so relevant personnel may check whether any abnormality occurs during the signing procedure. The signing log digital signature is obtained by performing hash computation on the signing log data to obtain a signing log hash that corresponds to the signing log data, followed by using the signing log private key to encrypt the signing log hash.

In step 38, the processing module 113 determines whether the signing log file is tampered with based on the signing log public key, the signing log data and the signing log digital signature. The flow goes to step 41 to start the releasing procedure when the processing module 113 determines that the signing log file is not tampered with, and ends when otherwise. In this embodiment, the procedure for determining whether the signing log file is tampered with is similar to the procedure for determining whether the compiling log file is tampered with (i.e., steps 241 to 243). That is, the processing module 113 uses the signing log public key to decrypt the signing log digital signature to obtain a signature-decrypted signing log hash (which should be the same as the signing log hash obtained in step 37); then, the processing module 113 performs hash computation on the signing log data to obtain a to-be-authenticated signing log hash (which should be the same as the signing log hash obtained in step 37 if the signing log data is not tampered with); and the processing module 113 determines whether the to-be-authenticated signing log hash matches the signature-decrypted signing log hash. The flow goes to step 41 when the processing module 113 determines that the to-be-authenticated signing log hash matches the signature-decrypted signing log hash, which means that the signing log file is not tampered with. Otherwise, the flow ends.

Figure 4:
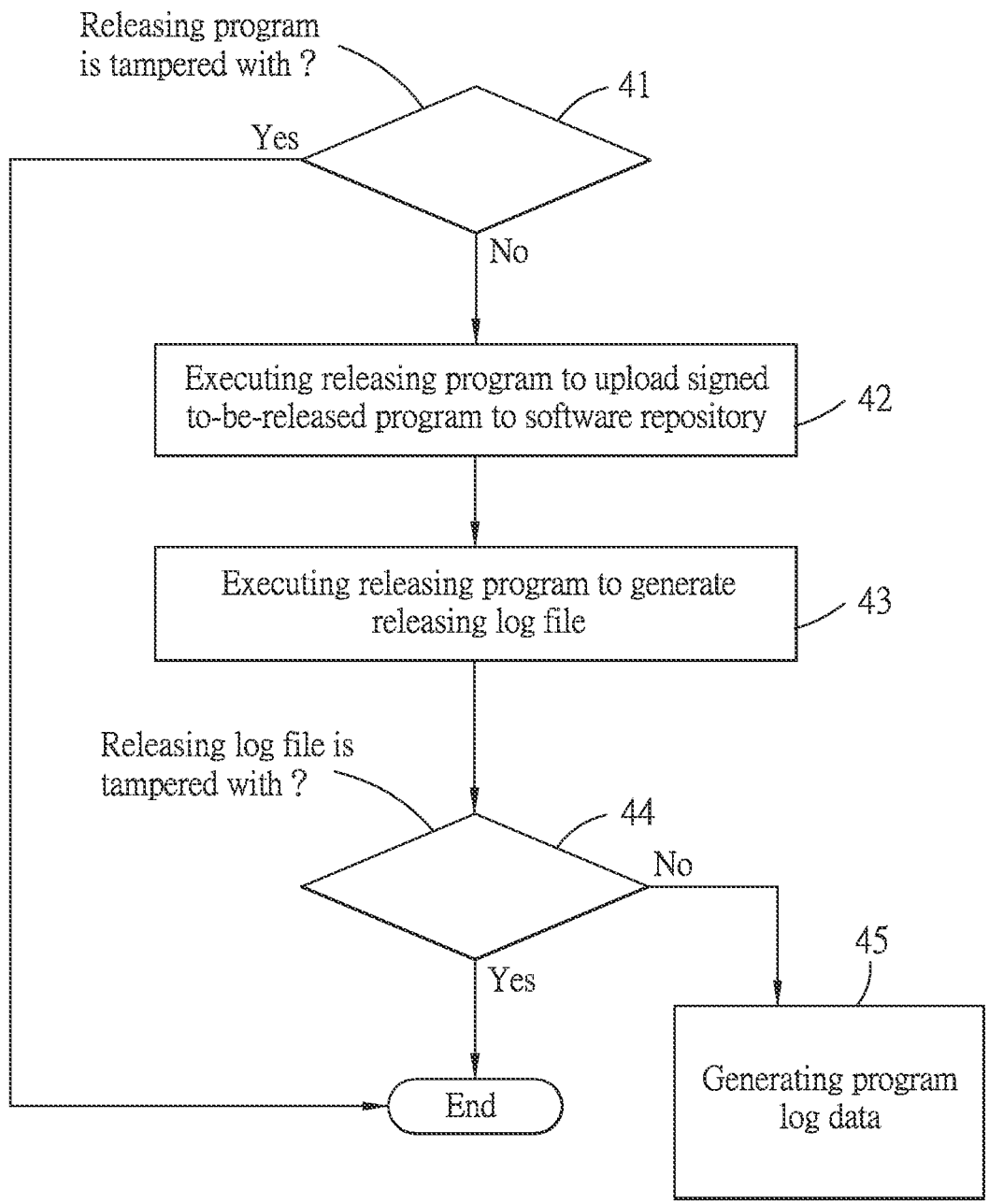
FIG. 4 is a flow chart illustrating a releasing procedure of the embodiment.

Referring to FIGS. 1 and 4, the releasing procedure is exemplified to include steps 41 to 45 for releasing the signed to-be-released program.

In step 41, the processing module 113 determines whether the releasing program is tampered with based on the releasing public key, the releasing code and the releasing digital signature. The flow goes to step 42 when the processing module 113 determines that the releasing program is not tampered with, and ends when otherwise. In this embodiment, the procedure for determining whether the releasing program is tampered with is similar to the procedure for determining whether the compiling program is tampered with (i.e., steps 211 to 213). That is, the processing module 113 uses the releasing public key to decrypt the releasing signature, so as to obtain a first releasing hash; then, the processing module 113 obtains a second releasing hash that is related to the releasing code by performing hash computation on the releasing code; and the processing module 113 determines whether the first releasing hash matches the second releasing hash, so as to determine whether the releasing program is tampered with. The flow goes to step 42 when the processing module 113 determines that the first releasing hash matches the second releasing hash, which means that the releasing program is not tampered with. Otherwise, the flow ends. However, this disclosure is not limited in this respect.

In step 42, the processing module 113 executes the releasing program to upload the signed to-be-released program to a software repository (e.g., Artifactory).

In step 43, the processing module 113 executes the releasing program to generate a releasing log file that is related to release of the signed to-be-released program. The releasing log file may be integrated with the signed to-be-released program to form a program package that is to be released to a client, clients, or the general public. The releasing log file includes a releasing log digital signature and releasing log data. In some embodiments, the releasing log file may further include the signing log file (which may include the compiling log file), but this disclosure is not limited in this respect. The releasing log data includes, for example but not limited to, a file name of the program package, a file to describe updates involved in this version (e.g., problems solved), a release note, etc. The releasing log file records a history in terms of releasing the to-be-released program, so relevant personnel may check whether any abnormality occurs during the releasing procedure. The releasing log digital signature is obtained by performing hash computation on the releasing log data to obtain a releasing log hash that corresponds to the releasing log data, followed by using the releasing log private key to encrypt the releasing log hash.

In step 44, the processing module 113 determines whether the releasing log file is tampered with based on the releasing log public key, the releasing log data and the releasing log digital signature. The flow goes to step 45 when the processing module 113 determines that the releasing log file is not tampered with, and ends when otherwise. In this embodiment, the procedure for determining whether the releasing log file is tampered with is similar to the procedure for determining whether the compiling log file is tampered with (i.e., steps 241 to 243). That is, the processing module 113 uses the releasing log public key to decrypt the releasing log digital signature to obtain a signature-decrypted releasing log hash (which should be the same as the releasing log hash obtained in step 43); then, the processing module 113 performs hash computation on the releasing log data to obtain a to-be-authenticated releasing log hash (which should be the same as the signing log hash obtained in step 43 if the releasing log data is not tampered with); and the processing module 113 determines whether the to-be-authenticated releasing log hash matches the signature-decrypted releasing log hash. The flow goes to step 45 when the processing module 113 determines that the to-be-authenticated releasing log hash matches the signature-decrypted releasing log hash, which means that the releasing log file is not tampered with. Otherwise, the flow ends.

In step 45, the processing module 113 generates program log data that includes the releasing log file, the signing log file (which may be included in the releasing log file in some embodiments), and the compiling log file (which may be included in the signing log file in some embodiments). The program log data can be provided to the client or clients, so the client or clients can check whether any abnormality occurs during the compiling procedure, the signing procedure and the releasing procedure.

In summary, in the embodiment of this disclosure, the processing module 113 executes the compiling program, the signing program and the releasing program to automatically perform compiling, signing and releasing procedures for the to-be-released program, so manual operation errors and malicious tampering can be avoided to enhance program security. In addition, before any of the compiling program, the signing program and the releasing program is executed, the processing module 113 verifies whether the compiling program, the signing program or the releasing program is tampered with, so as to ensure correctness and security of the compiling, signing and releasing procedures. Moreover, the log file for each of the compiling, signing and releasing procedures can be verified as to whether it has been tampered with, so relevant personnel can confirm the correctness of the log files, and use the log file to check whether any abnormality occurs in the compiling, signing and releasing procedures.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A program signing method comprising steps of:
providing a computing device, wherein the computing device includes a processing module and a storage module, and the storage module is electrically connected to the processing module and stores a signing program for signing a to-be-released program, and a signing public key for authenticating the signing program, the signing program including a signing digital signature and a signing code;
by the processing module, determining whether the signing program is tampered with based on the signing public key, the signing code and the signing digital signature;
upon determining that the signing program is not tampered with, by the processing module that executes the signing program, obtaining a releasing hash that is related to the to-be-released program, and transmitting the releasing hash to a signature server unit, so as to make a releasing digital signature based on the releasing hash and transmit the releasing digital signature to the processing module; and
upon receipt of the releasing digital signature, by the processing module that executes the signing program, generating a signed to-be-released program based on the releasing digital signature and the to-be-released program,
wherein the storage module further stores a compiling program for compiling the to-be-released program, and a compiling public key for authenticating the compiling program, the compiling program including a compiling digital signature and a compiling code;
wherein said program signing method further comprises, before the step of determining whether the signing program is tampered with, steps of:
by the processing module, determining whether the compiling program is tampered with based on the compiling public key, the compiling code and the compiling digital signature; and
upon determining that the compiling program is not tampered with, by the processing module that executes the compiling program, compiling the to-be-released program, so as to obtain a compiled to-be-released program;
wherein, in the step of obtaining the releasing hash, the releasing hash is obtained by performing a hash computation on the compiled to-be-released program;
wherein, in the step of generating the signed to-be-released program, the signed to-be-released program is generated by combining the releasing digital signature and the compiled to-be-released program;
wherein said program signing method further comprises, after the step of compiling the to-be-released program, a step of:
by the processing module that executes the compiling program, generating a compiling log file that is related to compiling of the to-be-released program, the compiling log file including a compiling log digital signature and compiling log data;
wherein the storage module further stores a compiling log public key for authenticating the compiling log file, and said program signing method further comprises, after the step of generating the compiling log file, a step of:
by the processing module, determining whether the compiling log file is tampered with based on the compiling log public key, the compiling log data and the compiling log digital signature;

wherein the processing module performs the step of determining whether the signing program is tampered with after determining that the compiling log file is not tampered with;

wherein said program signing method further comprises, after the step of determining whether the compiling log file is tampered with, a step of:

upon determining that the compiling log file is not tampered with, by the processing module, transmitting a request for approval to sign the compiled to-be-released program to a management-end computing device; and wherein the processing module performs the step of determining whether the signing program is tampered with upon receipt of a response that approves the request from the management-end computing device.

2. The program signing method of claim 1, the step of determining whether the signing program is tampered with includes:

by the processing module, using the signing public key to decrypt the signing digital signature to obtain a first signing hash;

by the processing module, obtaining a second signing has based on the signing code; and by the processing module, determining whether the first signing hash matches the second signing hash, so as to determine whether the signing program is tampered with.

3. The program signing method of claim 1, further comprising, after the step of generating the signed to-be-released program, a step of:

by the processing module that executes the signing program, generating a signing log file that is related to generation of the signal to-be-released program, and that includes a signing log digital signature and signing log data.

4. The program signing method of claim 3, wherein the storage module further stores a signing log public key for authenticating the signing log file, said program signing method further comprising, after the step of generating the signing log file, a step of:

by the processing module, determining whether the signing log file is tampered with based on the signing log public key, the signing log data and the signing log digital signature.

5. The program signing method of claim 4, wherein the storage module further stores a releasing program for releasing the to-be-released program, and a releasing public key for authenticating the releasing program, the releasing program including a releasing digital signature and a releasing code;

said program signing method further comprising, after the step of determining whether the signing log file is tampered with, steps of:

upon determining that the signing log file is not tampered with, by the processing module, determining whether the releasing program is tampered with based on the releasing public key, the releasing code and the releasing digital signature; and upon determining that the releasing program is not tampered with, by the processing module that executes the releasing program, uploading the signed to-be-released program to a software repository.

6. The program signing method of claim 5, further comprising, after the step of uploading the signed to-be-released program to a software repository, a step of:

by the processing module that executes the releasing program, generating a releasing log file that is related to release of the signed to-be-released program, the releasing log file including a releasing log digital signature and releasing log data.

7. The program signing method of claim 6, wherein the storage module further stores a releasing log public key for authenticating the releasing log file, said program signing method further comprising, after the step of generating the releasing log file, a step of:

by the processing module, determining whether the releasing log file is tampered with based on the releasing log public key, the releasing log data and the releasing log digital signature; and upon determining that the releasing log file is not tampered with, by the processing module, generating to-be-released program log data that contains the signing log file and the releasing log file.

* * * * *